US009791632B2

(12) United States Patent
Jacobsson (10) Patent No.: US 9,791,632 B2
(45) Date of Patent: Oct. 17, 2017

(54) OPTICAL ASSEMBLY (75) Inventor: Claes Jacobsson, Göteborg (SE)

(73) Assignee: Gigacom Interconnect AB (SE)

( * ) Notice: Subject to any disclaimer, the term of this patent is extended or adjusted under 35 U.S.C. 154(b) by 1051 days.

(21) Appl. No.: 11/922,912

(22) PCT Filed: Jul. 14, 2006

(86) PCT No.: PCT/EP2006/006923
§ 371 (c)(1),
(2), (4) Date: Sep. 9, 2008

(87) PCT Pub. No.: WO2007/009676
PCT Pub. Date: Jan. 25, 2007

(65) Prior Publication Data
US 2009/0110347 A1    Apr. 30, 2009

Related U.S. Application Data (60) Provisional application No. 60/700,315, filed on Jul. 19, 2005.

(30) Foreign Application Priority Data

Jul. 19, 2005  (SE) ...................... 0501711

(51) Int. Cl.
G02B 6/35    (2006.01)
G02B 6/32    (2006.01)
G02B 6/38    (2006.01)

(52) U.S. Cl.
CPC ............ G02B 6/3504 (2013.01); G02B 6/32 (2013.01); G02B 6/381 (2013.01); G02B 6/3846 (2013.01);
(Continued)

(58) Field of Classification Search
CPC ........ G02B 6/3504; G02B 6/32; G02B 6/381; G02B 6/3846; G02B 6/3874; G02B 6/327;
(Continued)

(56) References Cited

U.S. PATENT DOCUMENTS 4,183,618 A   1/1980 Rush et al.
4,658,130 A   4/1987 Durbin
(Continued)

FOREIGN PATENT DOCUMENTS

DE   42 27 803 A1    2/1993
EP   0 206 943 A2   12/1986
(Continued)

Primary Examiner — John M Bedtelyon
(74) Attorney, Agent, or Firm — Leydig, Voit & Mayer, Ltd.; John Augustyn (57) ABSTRACT There is provided an optical assembly (100) comprising an optical fiber arrangement (220, 230) and a lens arrangement (120). The lens arrangement (120) is spatially disposed relative to the fiber arrangement (220, 230) so as to be capable of providing an axial substantially collimated beam of radiation in response to receiving radiation from the optical fiber arrangement (220, 230) and capable of providing a focused beam of radiation to the optical fiber arrangement (220, 330) in response to receiving substantially collimated radiation to the lens arrangement (120). The assembly (100) further comprises a configuration of elements (110, 130, 200, 260) for spatially disposing the optical fiber arrangement (220, 230) relative to the lens arrangement (120). The configuration of elements (110, 130, 200, 260) provides for independent adjustment of relative lateral position between the optical fiber arrangement (220, 230) and the lens arrangement (120) in relation to axial position of the optical fiber arrangement (220, 230) relative to the lens
(Continued)

arrangement (120). Such independent adjustment assists in fabrication of the assembly (100).

30 Claims, 7 Drawing Sheets (52) U.S. Cl.
CPC ............ *G02B 6/3874* (2013.01); *G02B 6/327* (2013.01); *G02B 6/3853* (2013.01); *G02B 6/3877* (2013.01); *G02B 6/3878* (2013.01)

(58) Field of Classification Search
CPC ... G02B 6/3853; G02B 6/3877; G02B 6/3878
USPC ................ 385/25, 26, 31, 33–35, 76–94
See application file for complete search history.

(56) References Cited

U.S. PATENT DOCUMENTS

| | | |
|---|---|---|
| 4,696,538 A | 9/1987 | Despouys |
| 4,786,135 A | 11/1988 | Boero |
| 4,889,399 A | 12/1989 | Mariani et al. |
| 4,889,406 A * | 12/1989 | Sezerman ................ 385/35 |
| 4,915,470 A | 4/1990 | Moore et al. |
| 4,989,943 A | 2/1991 | Yoshinaga et al. |
| 5,042,891 A | 8/1991 | Mulholland et al. |
| 5,163,107 A | 11/1992 | Garriss |
| 5,170,454 A | 12/1992 | Kanai |
| 5,189,716 A | 2/1993 | Matsubara et al. |
| 5,278,929 A | 1/1994 | Tanisawa et al. |
| 5,315,680 A | 5/1994 | Musk et al. |
| 5,333,224 A | 7/1994 | Kikuchi |
| 5,363,461 A | 11/1994 | Bergmann |
| 5,364,391 A | 11/1994 | Konwitz |
| 5,434,941 A | 7/1995 | Bechtel et al. |
| 5,450,515 A | 9/1995 | Bechtel et al. |
| 5,459,805 A | 10/1995 | Foster |
| 5,511,139 A | 4/1996 | Nodfelt |
| 5,515,469 A | 5/1996 | Zarem et al. |
| 5,533,159 A | 7/1996 | Okochi et al. |
| 5,537,503 A | 7/1996 | Tojo et al. |
| 5,546,490 A | 8/1996 | Kikuchi et al. |
| 5,588,081 A | 12/1996 | Takahashi |
| 5,617,495 A | 4/1997 | Funabashi et al. |
| 5,642,450 A | 6/1997 | Oda |
| 5,659,645 A * | 8/1997 | Satake ................ 385/33 |
| 5,660,748 A | 8/1997 | Tanaka et al. |
| 5,668,899 A | 9/1997 | Jadrich |
| 5,684,903 A | 11/1997 | Kyomasu et al. |
| 5,687,270 A | 11/1997 | Takizawa |
| 5,751,878 A | 5/1998 | Kyoya |
| 5,761,354 A | 6/1998 | Kuwano et al. |
| 5,764,826 A | 6/1998 | Kuhara et al. |
| 5,787,215 A | 7/1998 | Kuhara et al. |
| 5,802,230 A | 9/1998 | Kuribayashi et al. |
| 5,803,575 A | 9/1998 | Ansems et al. |
| 5,815,623 A | 9/1998 | Gilliland et al. |
| 5,898,807 A | 4/1999 | Welsh |
| 5,905,827 A * | 5/1999 | Naganuma et al. ............ 385/31 |
| 6,035,664 A | 3/2000 | Hashizume |
| 6,040,934 A | 3/2000 | Ogusu et al. |
| 6,071,016 A | 6/2000 | Ichino et al. |
| 6,113,282 A | 9/2000 | Mao et al. |
| 6,126,325 A | 10/2000 | Yamane et al. |
| 6,263,133 B1 | 7/2001 | Hamm |
| 6,343,166 B1 | 1/2002 | Hellman et al. |
| 6,435,946 B1 | 8/2002 | Cintron et al. |
| 6,540,412 B2 | 4/2003 | Yonemura et al. |
| 6,582,135 B2 | 6/2003 | Brun et al. |
| 6,690,858 B2 | 2/2004 | Tsai et al. |
| 6,714,703 B2 | 3/2004 | Lee et al. |
| 6,729,770 B2 | 5/2004 | Brun et al. |
| 6,760,516 B2 | 7/2004 | Brun et al. |
| 6,764,224 B2 | 7/2004 | Brun et al. |
| 6,767,139 B2 | 7/2004 | Brun et al. |
| 6,782,162 B2 | 8/2004 | Fukuzawa et al. |
| 6,799,901 B2 | 10/2004 | Yoshimura et al. |
| 6,816,644 B1 | 11/2004 | Nodfelt et al. |
| 6,891,608 B2 | 5/2005 | Byer et al. |
| 6,960,026 B2 | 11/2005 | Brun et al. |
| 7,016,574 B2 | 3/2006 | Tateiwa |
| 7,048,449 B2 * | 5/2006 | Frojdh et al. ................ 385/88 |
| 7,068,883 B2 | 6/2006 | Ludington et al. |
| 7,103,246 B1 | 9/2006 | Zhu et al. |
| 7,187,826 B2 | 3/2007 | Brun et al. |
| 7,231,115 B2 | 6/2007 | Seto et al. |
| 7,270,487 B2 | 9/2007 | Billman et al. |
| 7,474,822 B2 | 1/2009 | Kobayashi et al. |
| 7,549,804 B2 * | 6/2009 | Healy ................ 385/92 |
| 2004/0021865 A1 | 2/2004 | Byer et al. |
| 2005/0220410 A1 | 10/2005 | Thompson |
| 2009/0324175 A1 | 12/2009 | Everett et al. |
| 2010/0027943 A1 | 2/2010 | Armani et al. |

FOREIGN PATENT DOCUMENTS

| | | |
|---|---|---|
| EP | 1 089 099 A2 | 4/2001 |
| EP | 1 542 291 | 6/2005 |
| GB | 2 145 534 A | 3/1985 |
| JP | 58-182611 | 10/1983 |
| JP | 59-109013 | 6/1984 |
| JP | 59-137915 | 8/1984 |
| JP | 60-42717 | 3/1985 |
| JP | 4-131817 | 5/1992 |
| JP | 4-195005 | 7/1992 |
| JP | 2003-279793 | 10/2003 |
| JP | 2003-279794 | 10/2003 |
| JP | 2003-322755 | 11/2003 |
| WO | WO 98/34146 A1 | 8/1998 |
| WO | WO 01/43245 A1 | 6/2001 |
| WO | WO 03/010564 A1 | 2/2003 |
| WO | WO 03/093875 A2 | 11/2003 |

* cited by examiner

OPTICAL ASSEMBLY

This application is a National Phase entry of PCT Application no. PCT/EP2006/006923 filed on Jul. 14, 2006 under 35 U.S.C. §365(c), which claims priority to Swedish Application No. 0501711-6, filed on Jul. 19, 2005, and to U.S. provisional application No. 60/700,315, filed on Jul. 19, 2005.

FIELD OF THE INVENTION

The present invention relates to optical assemblies, for example to optical assemblies for coupling optical fibers together and connecting optical fibers to data apparatus. Moreover, the present invention also relates to methods of manufacturing such optical assemblies. Furthermore, the invention relates to couplers and apparatus including such optical assemblies.

BACKGROUND TO THE INVENTION

It is known that contemporary optical fibers have relatively small optical cores often only a few micrometers in outer diameter, and an outer optical cladding having a diameter in an order of hundreds of micrometers in outer diameter, a refractive index difference between the optical cores and their corresponding optical claddings providing such contemporary optical fibers with light-guiding properties for conveying optical radiation bearing information therealong. Such light-guiding properties are employed widely within modern telecommunication systems. Such a relatively small outside diameter of the optical cores renders such fibers, especially monomode fibers having a core diameter of substantially 9 micrometers, potentially difficult to mutually align and thereby represents a problem in ensuring efficient coupling of optical energy therebetween. Although such coupling can be achieved by the use of precision zirconium ferrules to mutually precision abut fibers, practical problems are encountered in practice, especially regarding particulate contamination and condensation.

Figure 1:
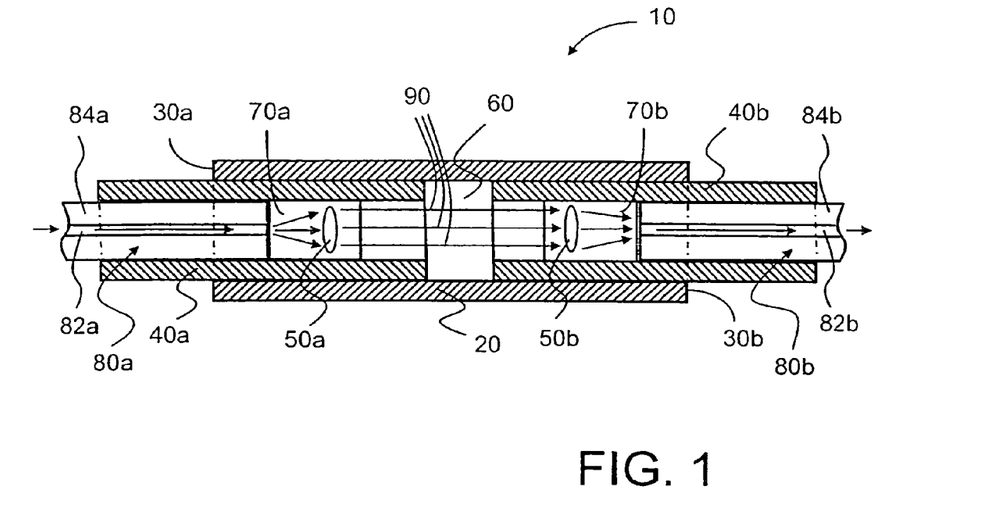
FIG. 1 is a schematic illustration in cross-section of a known type of expanded beam connector system.

Various approaches have been proposed for rendering optical fibers easier to mutually couple. For example, in a published international PCT patent application no. PCT/US02/23700 (WO 03/010564), there is described an expanded beam connector system illustrated in cross-sectional view in FIG. 1. The system indicated generally by 10 comprises a precision alignment tubular sleeve 20 having first and second ends 30a, 30b. First and second ferrules 40a, 40b are accommodated at the first and second ends 30a, 30b respectively of the sleeve 20 and extend into the sleeve 20 as illustrated. The first and second ferrules 40a, 40b include first and second collimating lenses 50a, 50b therein respectively. Moreover, a free-space region 60 between the first and second lenses 50a, 50b is permitted to remain substantially at a central portion of the sleeve 20. At faces 70a, 70b of the lenses 50a, 50b remote from the free-space region 60, the sleeve 20 provides support for first and second optical fibers 80a, 80b to abut to the first and second lenses 50a, 50b respectively, these fibers 80a, 80b each including a central optical core 82a, 82b and corresponding optical cladding 84a, 84b therearound. In operation, optical radiation guided substantially along the core 82a of the first fiber 80a propagates through the first lens 50a wherein the optical radiation is formed into a substantially collimated beam 90 whose diameter is considerably greater than that of the core 82a of the first fiber 50a. The collimated beam 90 propagates through the aforementioned free-space region 60 to be received by the second lens 50b which is operable to focus the received radiation to a focal point whereat the core 82b of the second fiber 80b is positioned. The radiation received at the core 82b of the second fiber 80b continues by propagating along the second fiber 80b. The aforesaid expanded beam connector system 10 is capable of coupling optical radiation from one type of optical fiber to another. Moreover, the connector system 10 is adapted for coping with relatively high-power optical signals. A benefit provided by the beam connector system 10 is that the optical radiation propagating in the free-space region 60 is conveyed by way of a beam of relatively large outer diameter, for example several hundred micrometers in outer diameter, rendering adjustment of the first and second fibers 80a, 80b to be relatively less critical for ensuring efficient coupling of the radiation from the first fiber 80a to the second fiber 80b and vice versa. The first ferrule 40a provides for mutual location of both the first fiber 80a and its corresponding first collimating lens 50a. Similarly, the second ferrule 40b provides for mutual location of both the second fiber 80b and its corresponding second collimating lens 50b. The precision alignment sleeve 20 provides for relative mutual alignment of the first and second ferrules 40a, 40b. In use, the collimated beam 90 renders mutual alignment of the first and second ferrules 40a, 40b less critical. The fibers 80a, 80b and their associated lenses 50a, 50b together with their ferrules 40a, 40b are fixed together and are not susceptible to being disassembled after initial manufacture. However, the ferrules 40a, 40b are capable of being mated and unmated from the tube 20 in use.

A further example of a contemporary approach to coupling optical radiation from a first optical fiber to a second optical fiber in an optical connection is described in a published United Kingdom patent no. GB 2, 145, 534. The optical connection includes first and second spherical lenses abutted to corresponding tapered location faces in first and second inner members. In the optical connection, the spherical lenses are retained in mutually spaced-apart disposition with a radiation propagation region provided therebetween. The first and second members also include tapered cavities for receiving ends of first and second optical fibers. The first and second members abut by way of tapered faces onto first and second corresponding tapered members. Moreover, the first and second tapered members are housed within a tubular member. In operation, the tubular member ensures that the first and second inner members are correctly positioned so that their lenses and fibers are corrected spaced and mutually in alignment. The optical connection functions in substantially a similar manner to the aforementioned expanded beam connector system. However, the optical connection employs many precision component parts and only caters for adjustment of a distance between the spherical lenses, namely an axial length of the radiation propagation region provided between the spherical lenses. Precise lateral alignment of the optical fibers to their corresponding lenses is provided inherently by use of the tapered cavities and the tapered faces of the first and second tapered members and corresponding tapered faces of the first and second inner members. The optical connection is thereby potentially costly to manufacture on account of a relatively large number of precision parts being required to be precision manufactured and thereafter mutually assembled. Moreover, the optical connection is adapted for coupling multimode fibers together whose central optical cores have a diameter in the order of 50 micrometers. The optical connection is unsuitable for coupling monomode fibers together, such fibers have an optical core diameter in the order of 9 micrometers, on account of excessive precision to which component parts of the optical connection would have to be manufactured.

Thus, the aforementioned expanded beam connector system does not allow for decoupling of its optical fibers from their respective lenses in use, and the optical connection is complex and potentially costly to manufacture on account of precision components being required for its manufacture.

SUMMARY OF THE INVENTION

An object of the present invention is to provide an optical assembly which is operable to provide a collimated beam of radiation and which requires fewer precision components in its manufacture and yet allows for repetitive coupling and uncoupling of its associated optical fiber.

A further object of the invention is to provide a method of manufacturing such an optical assembly requiring fewer precision components.

A yet further object of the invention is to provide optical systems and couplers including one or more such optical assemblies.

According to a first aspect of the present invention, there is provided an optical assembly comprising an optical fiber arrangement operable to detachably receive an optical fiber terminated by a ferrule, a lens arrangement, said lens arrangement being spatially disposed relative to the fiber arrangement so as to be capable of providing an axial substantially collimated beam of radiation in response to receiving radiation from the optical fiber arrangement and capable of providing a focused beam of radiation to the optical fiber arrangement in response to receiving substantially collimated radiation to the lens arrangement, said assembly further comprising a configuration of elements for spatially disposing the optical fiber arrangement relative to the lens arrangement, said configuration of elements providing for positional adjustment of the optical fiber arrangement relative to the lens arrangement.

The invention is of advantage in that the optical assembly is capable of being detached from its associated optical fiber, and the optical assembly further provides for adjustment of the position of the fiber arrangement relative to the lens arrangement, thereby rendering the optical assembly more straightforward to manufacture and employ in practice.

Optionally, the configuration of elements is operable to provide for independent adjustment of relative lateral position between the optical fiber arrangement and the lens arrangement in relation to axial position of the optical fiber arrangement relative to the lens arrangement.

Optionally, the assembly is arranged so that said adjustment of relative lateral position is provided by a plurality of the elements being provided with mutually abutting surfaces so disposed to accommodate lateral adjustment of the fiber arrangement relative to the lens arrangement. Such abutting surfaces allow for convenient adjustment of relative lateral position.

Optionally, the assembly is arranged so that said adjustment of relative axial position is provided by a plurality of the elements being provided with mutually abutting surfaces so disposed to accommodate axial adjustment of the fiber arrangement relative to the lens arrangement. Such abutting surfaces allow for convenient adjustment of relative axial position.

Optionally, the assembly is arranged so that at least a portion of the mutually abutting surfaces are accessible at an exterior region of the assembly for enabling adjustment of the relative lateral position when the assembly is in an assembled state. Such an implementation enables the assembly to be adjusted when in an assembled state.

Optionally, then assembly is arranged so that at least a portion of the mutually abutting surfaces are accessible at an exterior region of the assembly for enabling adjustment of the relative axial position when the assembly is in an assembled state. Such an implementation enables the assembly to be adjusted when in an assembled state.

More optionally, the assembly is arranged such that the portion of the mutually abutting surfaces is disposed so as to allow for relative immobilization of the abutting surfaces for rendering permanent a given relative positioning of the lens arrangement relative to the fiber arrangement. Yet more optionally, the elements are fabricated from materials susceptible to being fused or bonded for achieving said relative immobilization.

Optionally, the assembly is arranged so that the elements are fabricated from one or more of: metal, plastics material, ceramic, sintered material, glass, silica, sapphire, materials with optically refractive properties.

Optionally, in the assembly, the fiber arrangement comprises a fiber stub spatially disposed between the lens arrangement and an optical fiber with associated ferrule for conveying radiation to and/or from the assembly. The fiber stub is beneficial in that it defines a position for providing radiation to the lens arrangement, or receiving radiation from the lens arrangement, which is spatially stable relative to the lens arrangement substantially irrespective of optical fibers being repetitively mated to/unmated from the optical assembly.

Optionally, in the optical assembly, an end of the fiber arrangement facing towards said lens arrangement is spatially spaced apart therefrom, namely not abutting thereto, to provide an increased diameter to the beam of radiation. Including a space between the end of the fiber arrangement and the lens arrangement is capable of resulting in greater beam diameter, especially when an aspherical lens is employed in the lens arrangement.

Alternatively, in the optical assembly, an end of the fiber arrangement facing towards said lens arrangement is abutted to the lens arrangement. Such abutment is capable of rendering the assembly less critical to automatically adjust during manufacture.

Optionally, in the assembly, the elements are adapted to allow for repetitive cycles of mating/unmating of the optical fiber with its associated ferrule relative to the fiber stub whilst ensuring axial alignment thereof for enabling optical radiation to be substantially coupled therebetween. Such a characteristic renders the optical assembly susceptible to being repetitively uncoupled from its optical fiber.

Optionally, in the assembly, at least one of the lens arrangement and fiber stub are provided with antireflection coatings for reducing optical reflection thereat. Such antireflection coatings are capable of reducing optical transmission loss through the optical assembly, for example to less than 1 dB.

Optionally, the assembly further comprises an optical isolator in optical series with the fiber arrangement and the lens arrangement.

Optionally, in the assembly, the fiber stub is provided with polished optical end faces whose planes are substantially perpendicular relative to a central optical axis of the fiber stub. Such polishing assists to reduce optical transmission loss through the optical assembly and return loss.

Optionally, in the assembly, the fiber stub is provided with one or more obliquely formed optical end faces whose planes are substantially non-perpendicular relative to a central optical axis of the fiber stub. Such oblique end faces are susceptible to reducing occurrence in operation of optical reflections within the optical assembly. More optionally, the one or more obliquely formed optical end faces subtend an angle of substantially 90 relative to a perpendicular to a central optical axis of the fiber stub.

Optionally, in the assembly, the lens arrangement comprises at least one of: an aspherical lens, a spherical ball lens, a configuration comprising a plurality of lenses, a graded-refractive index lens.

More optionally, in the optical assembly:

(a) the lens arrangement comprises an aspherical or ball lens;
(b) the fiber arrangement comprises a fiber stub having an outer ferrule, said fiber stub and its ferrule being operable to mount within a split sleeve and to be attached to a first element of a configuration of elements;
(c) the configuration of elements includes a second element thereof which is operable to support the aspherical or ball lens and function in cooperation with a third element to provide for axial adjustment of the assembly during manufacture; and
(d) the configuration of elements is disposed such that the first and third elements function in cooperation to provide for lateral adjustment of the assembly during manufacture.

According to a second aspect of the present invention, there is provided an optical coupler comprising a plurality of optical assemblies, each optical assembly being according to the first aspect of the invention, the optical coupler being provided with a plurality of optical fibers for conveying optical radiation thereto and/or therefrom via the plurality of optical assemblies.

According to a third aspect of the present invention, there is provided an optical switching network comprising a plurality of optical assemblies, each optical assembly being according to the first aspect of the invention, said plurality of optical assemblies being provided with a beam steering arrangement for steering directions of collimated beams of radiation in operation via said plurality of optical assemblies, thereby selectively directing optical radiation via one or more of said assemblies and thereby selectively through the network.

According to a fourth aspect of the present invention, there is provided a system comprising one or more of chassis elements, processing boards and packplane boards, said system including one or more assemblies according to the first aspect of the invention for coupling optical radiation between one or more of the chassis elements, the processing boards, the backplane boards and to an environment external thereto.

According to a fifth aspect of the invention, there is provided a method of adjusting relative alignment of a lens arrangement to a fiber arrangement of an optical assembly according to the first aspect of the invention, said method comprising steps of:

(a) providing optical radiation to the fiber arrangement for propagation to the lens arrangement for emission therefrom as a beam of radiation;
(b) adjusting elements of the assembly for ensuring that the beam is laterally aligned relative to an optical axis of the lens arrangement; and
(c) adjusting elements of the assembly for ensuring that the beam is substantially collimated.

According to a sixth aspect of the invention, there is provided a method of adjusting relative alignment of a lens arrangement to a fiber arrangement of an optical assembly according to the first aspect of the invention, said method comprising steps of:

(a) providing substantially axially to the lens arrangement a beam of substantially collimated optical radiation to the lens arrangement for propagation therethrough to the fiber arrangement;
(b) adjusting elements of the assembly for adjusting relative lateral positioning of the lens arrangement relative to the fiber arrangement so as to achieve a maximum coupling of radiation conveyed in the beam to the fiber arrangement; and
(c) adjusting elements of the assembly for adjusting axial position of the lens arrangement relative to the fiber arrangement so as to achieve a maximum coupling of radiation conveyed in the beam to the fiber arrangement.

Optionally, aforesaid methods comprise an additional step of mutually immobilizing the adjusted elements to fix adjustment of the assembly. More optionally, such mutual immobilization involves mutually fusing or binding the adjusted elements. Yet more optionally, the aforesaid methods are implemented automatically.

It will be appreciated that features of the invention are susceptible to being combined in any combination without departing from the scope of the invention as defined by the accompanying claims.

DESCRIPTION OF THE DIAGRAMS

By way of example only, embodiments of the present invention will now be described with reference to the accompanying drawings wherein.

DESCRIPTION OF EMBODIMENTS OF THE INVENTION

Figure 2:
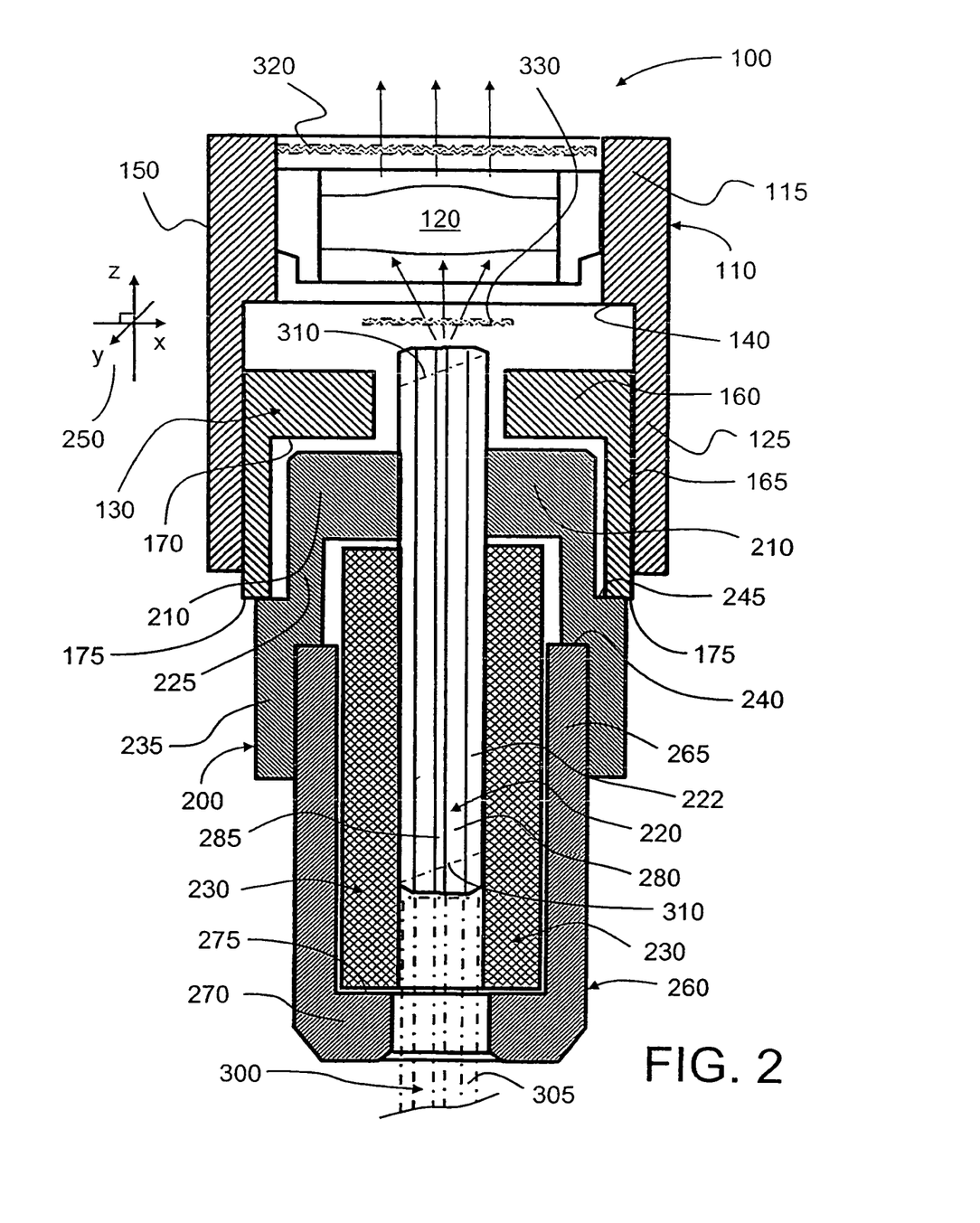
FIG. 2 is a schematic illustration in cross-section of an optical assembly according to the present invention.

An embodiment of an optical assembly according to the present invention is illustrated in FIG. 2, the assembly being indicated generally by 100 and being also known as an Expanded Beam Optical Sub Assembly (EBOSA). The assembly (EBOSA) 100 is capable of being employed to implement an expanded beam connector, and also to implement a free-air communication link capable of being used in field situations where precision alignment apparatus is not available. The assembly 100 comprises an outer lens holder 110 of substantially tubular form, the lens holder 110 having a first portion 115 with relatively thicker wall for receiving a lens 120 therein, and a second portion 125 with relatively thinner wall for receiving a z-axis alignment sleeve 130. A step transition 140 is provided on an inner surface of the lens holder 110, the step transition 140 distinguishing the first portion 115 from the second portion 125. The step transition 140 is also capable of preventing the z-axis alignment sleeve 130 being advanced excessively within the lens holder 110. An outer surface 150 of the lens holder 110 is operable to provide an exterior reference surface for the assembly 100 as will be elucidated in more detail later.

The z-axis alignment sleeve 130 is of a generally tubular form and has a first portion 160 which is relatively thicker to provide the z-axis alignment sleeve 130 with rigidity and to provide an orifice as illustrated. Moreover, the z-axis alignment sleeve 130 further has a second portion 165 which is relatively thinner. A step transition 170 is provided between the first and second portions 160, 165 of the z-axis alignment sleeve 130. The z-axis alignment sleeve 130 additionally has formed thereon an end reference surface 175 at an extreme peripheral edge of the second portion 165. The z-axis alignment sleeve 130 is arranged to receive a fiber stub holder 200 of generally tubular form. The fiber stub holder 200 includes a first portion 210 whose inner surface is a precision fit for receiving a zirconium ferrule 222 of a fiber stub 220, and whose outer surface is deliberately manufactured to be smaller in outside diameter than an inner surface of the second portion 165 of the z-axis alignment sleeve 130. The stub holder 200 includes a second portion 225 whose inner diameter is greater than that of the fiber stub 220 to provide space for accommodating an end portion of a split sleeve 230. The stub holder 200 further includes a third portion 235 such that a transition from the second portion 225 to the third portion 235 provides an inside step 240 and an outside step 245; the inside and outside steps 240, 245 are staggered as illustrated to provide the stub holder 200 with sufficient rigidity at the transition. The outside step 245 is arranged to abut to the end reference surface 175. Moreover, the outside step 245 is operable to cooperate with the end reference surface 175 so that the stub holder 200 is capable of being moved laterally in directions denoted by x and y on a Cartesian set of reference axes 250; the lateral direction y is orthogonal to the plane of FIG. 2 whereas the lateral direction x is in the plane of FIG. 2. Similarly, the z-axis alignment sleeve 130 is arranged to be a slidable fit into the second portion 125 of the lens holder 110, the z-axis alignment sleeve 130 thereby being susceptible to being adjusted in position relative to the lens holder 110, such adjustment of position being along an axial direction denoted by z on the set of reference axes 250.

The third portion 235 of the stub holder 200 includes an inner surface for receiving an end-portion outer surface of a shell 260 whose first portion 265 at its extreme end is operable to abut onto the inside step 240 and also provide mechanical protection for the aforementioned split sleeve 230. The split sleeve 230 is however a loose fit within the shell 260 and the stub holder 200. Optionally, the inner surface of the third portion 235 and an outer surface of the shell 260 can include one of more features for ensuring reliable mechanical retention of the shell 260 within the stub holder 200, for example mutually cooperating screw threads or barbs. The first portion 265 of the shell 260 provides a degree of mechanical protection to the split sleeve 230 and thereby also protection for the fiber stub 220. The shell 260 also includes a second portion 270 having a thicker wall than the first portion 265 thereby defining a step transition 275 operable to retain the split sleeve 230 as loose fit within the shell 260. The second portion 270 defines an orifice of slightly greater diameter than an inner diameter of the split sleeve 230. The split sleeve 230 is susceptible to receiving an optical fiber 300, the optical fiber 300 being provided at its end susceptible to being coupled to the assembly 100 with an outer zirconium ferrule 305 which is a precision fit within the split sleeve 230. The split sleeve 230 is thereby operable to provide a highly precise alignment of the optical fiber 300 to the fiber stub 220 so that their optical cores correctly align to potentially sub-micron accuracy for ensuring efficient optical radiation coupling therebetween.

The lens holder 110, the z-axis alignment sleeve 130, the stub holder 200, the split sleeve 230 and the shell 260 are optionally fabricated from at least one of: metal, plastics material, ceramic, sintered material, glass, silica, sapphire, materials with optically refractive properties. Optionally, the lens holder 110, the z-axis alignment sleeve 130, the stub holder 200 and the shell 260 are fabricated from one or more metals to ensure their mechanical stability and also, as will be elucidated later, allow for laser welding of one or more thereof. Optionally, the sleeve 130 can be fabricated from a sintered material or a ceramic material, for example zirconium. The lens 120 is susceptible to being implemented as an aspherical lens, although other types of lenses can optionally be employed; such other types of lenses include one of more of a graded index lens, a spherical lens. More optionally, the lens 120 can be provided with an antireflection coating to reduce optical reflections occurring between the fiber stub 220 and the lens 120. Optionally, at least one of a front side and a back side of the lens 120 includes an antireflection coating thereon. Similarly, an exposed end of the fiber stub 220 presented towards the lens 120 can be polished and, optionally, provided with an antireflection coating. As a further optional variation of the assembly 100, at least one end of the fiber stub 220 can be cleaved or otherwise formed into an oblique surface relative to a central axis parallel to an optical core 285 of the fiber stub 220; such oblique surfaces are represented by dotted lines 310 in FIG. 2 and are optionally at an angle in a range of 5° to 15° relative to a perpendicular to the central axis parallel to the optical core 285. More optionally, the oblique angle is substantially 9°. The fiber stub 220 can be configured either to abut at one of its ends onto the lens 120, or for there to be free space between the fiber stub 220 and the lens 120. Such abutment is of benefit when the lens 120 is implemented as a ball lens. Moreover, such free space is of benefit when the lens 120 is implemented as an aspherical lens In operation, optical radiation conveyed by way of the optical fiber 300 is coupled from a central core of the fiber 300 to substantially the core 285 of the fiber stub 220 and therethrough to be emitted from the core 285 in a divergent manner to the lens 120. The lens 120, in turn, is operable to refract radiation received thereat from the core 285 and thereby generate a substantially collimated beam of radiation for emission from the lens 120 as illustrated. It will be appreciated that the assembly 100 is also operable to couple substantially collimated radiation received at the lens 120 via the fiber stub 220 into the optical fiber 300. Optionally, the lens 120 can be supplemented with one or more additional optical components 320, 330. The additional optical components 320, 330 can include one or more of an optical filter, an optical isolator, an optical window. More optionally, the optical components can include antireflection (AR) coatings. Moreover, one or more surfaces of the lens 120 can be antireflection coated.

Implementation of the assembly 100 as illustrated in FIG. 2 is of benefit in that slidable interfaces between the lens holder 110 and the z-axis alignment sleeve 130, as well as between the z-axis alignment sleeve 130 and the stub holder 200 are conveniently accessible at an outer region of the assembly 100. Such accessibility is further illustrated in FIG. 3 wherein a first accessible interface 400 is provided between the lens holder 110 and the z-axis alignment sleeve 130, and a second accessible interface 410 is provided between the z-axis alignment sleeve 130 and the stub holder 200. A further interface 420 concerns relative position of the stub holder 200 to the shell 260. Operations such as laser welding or other immobilization measures such as adhesive bonding, mechanical crimping, friction welding, electrical current welding applied to the interfaces 400, 410 during manufacture of the assembly 100 after relative adjustment of the lens holder 110, the z-axis alignment sleeve 130 and the stub holder 200 ensure desired alignment and collimation properties are exhibited by the assembly 100, and ensure that the assembly 100 stably continues to exhibit desired optical properties when in field use.

Figure 3:
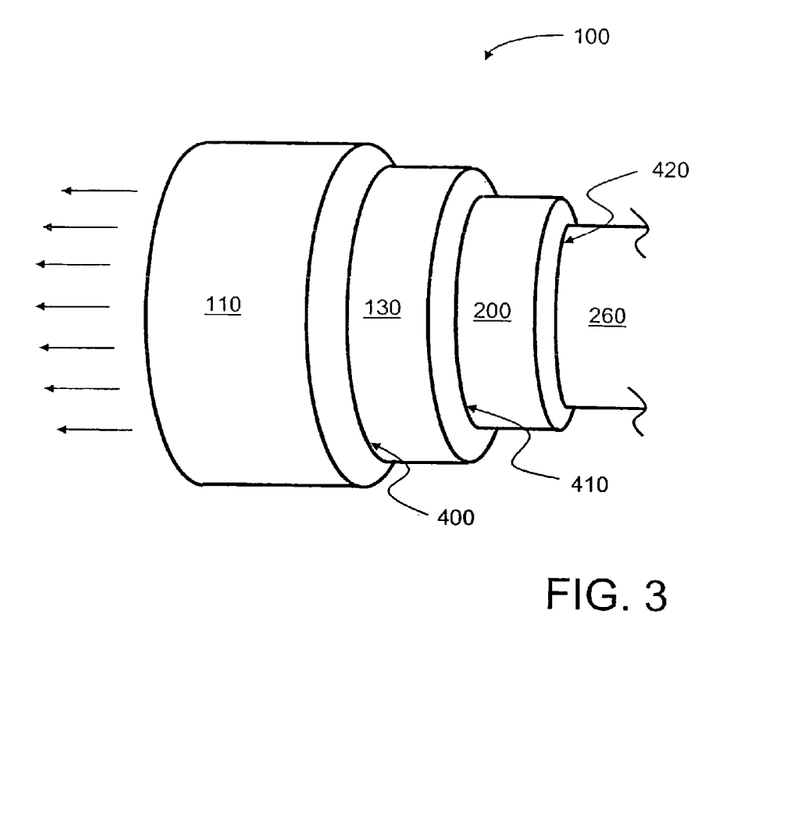
FIG. 3 is a schematic exterior view of a portion of the optical assembly of FIG. 2.

Immobilization at the interface 400, for example by laser welding, is capable of defining a desired separation of the fiber stub 220 to the lens 120, thereby ensuring that the assembly 100 is operable to provide a collimated beam of optical radiation, or efficiently receive a collimated beam of radiation. Moreover, immobilization at the interface 410, for example by laser welding, is capable of defining a desired lateral alignment of the fiber stub 220 to the lens 120, thereby ensuring that a collimated beam is emitted from the lens 120 substantially along a principal axis of the lens 120. Thus, the assembly 100 allows for independent adjustment of lateral alignment and collimation focus during manufacture as well as straightforward fixing of the adjustment by way of access to the interfaces 400, 410. Such characteristics of the assembly 100 enable automatic adjustment to be performed on manufacture wherein lateral alignment adjustment is optionally executed initially followed by collimation adjustment thereafter. Manufacturing tolerances of component parts of the assembly 100 are thereby less critical in comparison to known contemporary optical couplers as these tolerances can be compensated for during adjustment of the assembly 100 during its manufacture. Potentially, the assembly 100 is capable of providing a high yield in manufacture.

Dimensions of component parts of the assembly will now be described. The lens holder 110 optionally has an axial length in a range of 3 to 10 millimeters, more optionally substantially 5 millimeters. Moreover, the lens holder 110 optionally has an outer diameter, namely pertaining to the reference surface 150, in a range of 2 millimeters to 6 millimeters, more optionally substantially 3.5 millimeters. The shell 260 optionally has an external diameter in a range of 2 millimeters to 4 millimeters, more optionally substantially 2.5 millimeters. Furthermore, the assembly 100 optionally has an overall axial length from a remote end surface of the lens holder 110 to a remote end of the shell 260 in a range of 8 millimeters to 15 millimeters, more optionally substantially 12 millimeters. When the lens 120 is implemented as a ball lens, namely as a spherical lens, the ball lens optionally has a diameter in a range of 1 millimeter to 5 millimeters, more optionally substantially 3 millimeters. Optionally, the lens 120 can be implemented as a plurality of lenses, for example to enable the assembly 100 to provide a collimated beam in operation from the lens 120 which is greater in diameter in comparison to a beam diameter achievable when merely a single lens is employed. However, it will be appreciated that other physical dimensions for components parts of the assembly 100 are feasible and are to be construed to be within the scope of the present invention as defined by the accompanying claims.

The fiber stub 220 optionally has an outer diameter of substantially 1.25 millimeters, namely a standard dimension employed in contemporary LC and MU optical connectors. Alternatively, the fiber stub 220 can have an outer diameter of substantially 2.5 millimeters, namely a standard dimension employed in contemporary FC, ST and SC optical connectors. The lens 120 is operable to provide a collimated beam of radiation therefrom which has a diameter substantially in an order of 14 times more than substantially a diameter of the core 285 of the fiber stub 220 when the stub 220 is adapted for multimode optical radiation propagation therethrough; such 14 times increase corresponds to a beam area increase of substantially 200 times. Conversely, when the fiber stub 220 is adapted for monomode optical radiation propagation therethrough, a collimated beam of radiation emitted from the lens 120 in operation is over 45 times more than substantially the diameter of the core 285, such 45 times increase corresponds to a beam area increase of substantially 2000. Such increases in beam area render the assembly 100 easier to align to other similar assemblies and less sensitive to thermal changes and contamination. For example, the assembly 100 is susceptible in operation to providing a collimated beam from the lens 120 wherein the beam has a diameter in a range of 0.8 millimeters to 1.2 millimeters which is considerable more than provided by contemporary prior art arrangements as described in the foregoing. Such characteristics provide the assembly 100 with enhanced performance when employed in field environments.

Figure 4:
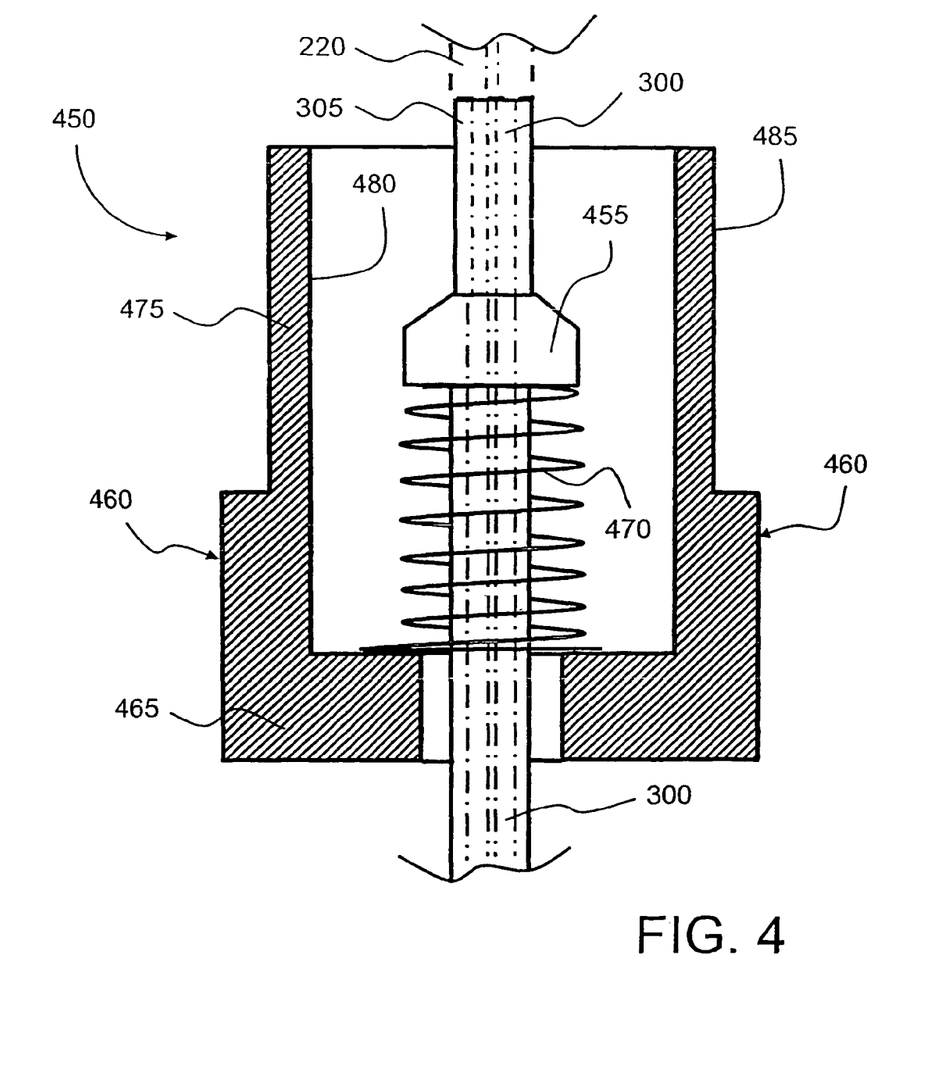
FIG. 4 is a schematic illustration of a housing element for use with the optical assembly of FIG. 2.

Referring to FIG. 4, the fiber 300 and its associated ferrule 305 are optionally provided with a retention housing indicated generally by 450. The ferrule 305 extends backwards from an end of the fiber 300 offered in operation to the fiber stub 220, the ferrule 305 terminating in a collar element 455 of broader outer diameter than the ferrule 305 as illustrated. The retention housing 450 also comprises a housing element 460 including a nut-like end 465 including a hole through which the fiber 300 is directed, and which provides a surface for abutting onto a first end of an axially compliant element 470. A second end of the axially compliant component 470 is disposed so as to abut onto the aforementioned collar element 455. Beneficially, the compliant element 470 is implemented as a coiled wire spring, although other implementations are possible; for example the compliant element 470 can be implemented as a compressible polymer or rubber sleeve. The housing element 460 is optionally of substantially tubular form although other forms are possible. Moreover, the housing element 460 further comprises a coupling portion 475 remote from the nut-like end 465 which is optionally capable of being engaged in use onto the assembly 100, for example onto the shell 260, and/or onto the lens holder 110. Such engagement of the coupling portion 475 can be achieved by including a screw thread on an inside surface 480 of the coupling portion 475. Alternatively, the coupling portion 465 can be arranged to engage onto an external component (not shown) to which the assembly 100 is also abutted, for example by way of the reference surface 150 and an end region of the lens component 110; such engagement with the external component can be achieved by way of a screw formed on an outside surface 485 of the coupling portion 465 which is operable to cooperate with a corresponding thread in the external component. Alternative forms of engagement are also possible, for example click-fit features or barbed features.

The retention housing 450 employed in combination with the assembly 100 is susceptible to providing several advantages. A first advantage is that the compliant element 460 is capable of ensuring that the ferrule 305 and the fiber 300 are firmly abutted to the fiber stub 220 by way of a compressive force exerted by the compliant element 470. Moreover, the retention housing 450 is capable of providing mechanical protection to the assembly 100. Moreover, the retention housing 450 is beneficial to employ when constructing optical couplers as will now be described.

Figure 5A:
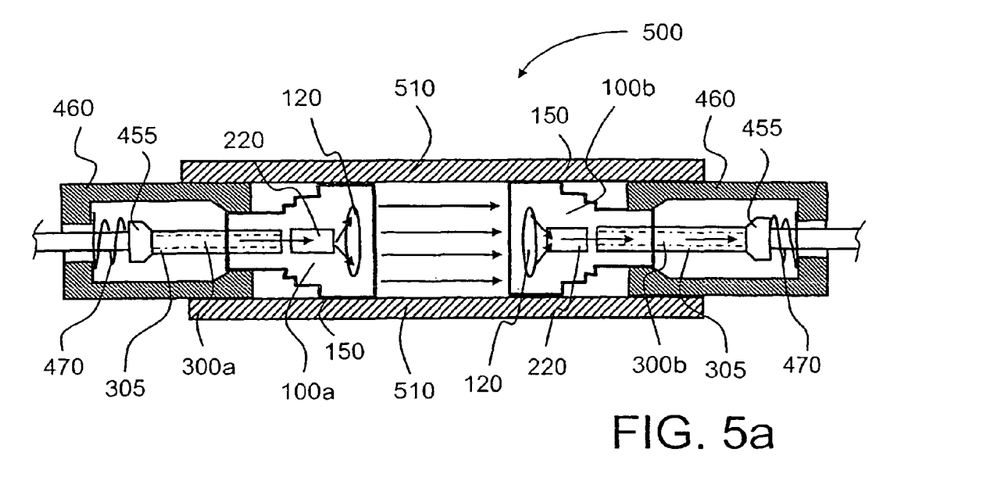
FIGS. 5a, 5b, 5c are schematic illustrations of optical couplers for coupling optical radiation between optical fibers, the couplers including optical assemblies of a type as illustrated in FIG. 2.

In FIG. 5a, two assemblies 100a, 100b are shown in a juxtaposed configuration for coupling optical radiation from a first optical fiber 300a to a second optical fiber 300b in an optical coupler indicated generally by 500. The assemblies 100a, 100b are each similar to the aforementioned assembly 100, for example as illustrated in FIG. 2. Moreover, the assemblies 100a, 100b are disposed such that their lenses 120 are mutually facing and substantially axially aligned. The coupler 500 is provided with an external coupling element 510, for example implemented as a tubular sleeve, an inner surface of the coupling element 510 cooperating with the reference surface 150 of the assemblies 100a, 100b to ensure such alignment. Each assembly 100a, 100b, is provided with its retention housing 450 firmly attached to its corresponding shell 260. On account of a collimated beam bearing radiation between the lenses 120 when the coupler is in operation, the collimated beam being several millimeters in diameter, coupling and uncoupling of the assemblies 100a, 100b attached to their associated retention housings 450 can be performed in field environments wherein the coupler 500 is relatively insensitive to particulate contamination; the aforementioned reference surfaces 150 assist in cooperating with the coupling element 510 to ensure that adequate mutual alignment of the assemblies 100a, 100b is repetitively achievable when the coupler 500 is assembled and disassembled. Moreover, in relatively cleaner conditions than encountered in field environments, the fibers 300a, 300b together with their associated ferrules 305 and their retention housings 450 can be uncoupled from and coupled to the assemblies 100a, 100b. Such characteristics render the coupler 500 easier to manufacture because the assemblies 100a, 100b are provided automatically pre-adjusted at manufacturer and subsequently immobilized such that their fiber stubs 220 and their lenses 120 are correctly aligned and focused. As elucidated in the foregoing, collimation of optical radiation propagating through the assemblies 100a, 100b renders the coupler 500 relatively insensitive to dimensional errors, alignment errors and contamination.

The coupler 500 represents a considerable technical improvement to contemporary couplers wherein optical fibers of such contemporary couplers are not capable of being uncoupled from their corresponding lenses after initial manufacture of the contemporary couplers. Moreover, in order to render adjustment easier, contemporary couplers employ smaller collimated beam sizes of several hundred micrometers diameter whereas the coupler 500 can be configured to employ collimated beam sizes of several millimeters diameter, thereby rendering the coupler 500 more robust in field use. Such large collimated beam diameters as employed in the coupler 500 would be impractical in contemporary collimated beam couplers because focus adjustment would be extremely difficult to adjust and keep stable over time or component tolerances required would be impractically small. The aforementioned assemblies 100a, 100b represent a considerable improvement in comparison to contemporary optical couplers, wherein the assemblies 100a, 100b are principally responsible for the improvement on account of their stability and ease of adjustment during initial manufacture prior to relative immobilization of their components parts.

An operating pair of assemblies 100a, 100b as illustrated in FIG. 5a has three air gaps, namely:
(a) a first air gap between the fiber stub 220 and its associated lens 120 of the assembly 100a;
(b) a second air gap between the lenses 120 of the assemblies 100a, 100b; and
(c) a third air gap between the lens 120 and its associated fiber stub 220 of the assembly 100b.

Fresnel losses arising in operation at these three air gaps is in the order of 1.02 dB when antireflection coatings within the coupler 500 are not employed. When such coatings are employed, the coupler 500 is operable to exhibit an insertion loss of 0.6 dB. Angle polishing the fiber stubs 220 can further reduce insertion loss of the coupler 500 to potentially less than 0.6 dB in practice.

The coupler 500 is susceptible to including one or more optical isolators in an optical path between its fibers 300a, 300b within the coupler 500. Moreover, optical filters can optionally be included within the coupler 500. Optionally, one or more of the assemblies 100a, 100b can be provided with an optical isolator, for example in combination with their fiber stubs 220.

The coupler 500, similarly the assembly 100, is susceptible to being well adapted for applications wherein repeated mating/unmating cycles are encountered and wherein insensitivity to environmental conditions such as temperature, dust and moisture is desirable.

Figure 5B:
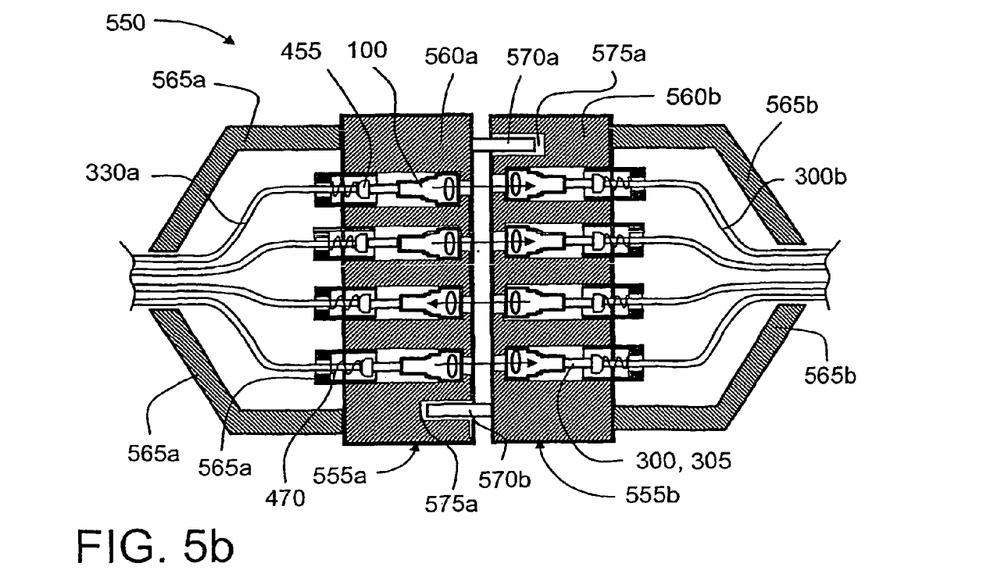

In FIG. 5b, there is shown a multichannel coupler indicated generally by 550. The multichannel coupler 550 essentially comprises a plurality of the couplers 500 co-located together but with some mechanical modifications. The multichannel coupler 550 comprises a first part 555a and a second part 555b; these parts 555a, 55b can be fabricated from metal, plastics material, ceramic, glass for example. The first and second parts 555a, 555b include first and second body members 560a, 560b respectively; these body members 560a, 560b can also be fabricated from metal, plastics material, ceramic, glass for example. The body members 560a, 560b are operable to mutually engage when the first and second parts 555a, 555b of the multichannel coupler 550 are mated together. Each body member 560a, 560b includes several hole-like cavities extending from rear regions of the body members 560a, 560b to front regions thereof as illustrated. The cavities are optionally of round form. Each cavity is restricted close to the front region of its respective body member 560a, 560b to provide a reference transition step to which the lens holder 110 of the assembly 100 associated with the cavity is capable of abutting for spatial registration as illustrated. Moreover, each cavity is provided close to the rear region of its corresponding body member 560a, 560b with a screw thread for engaging onto a corresponding exterior screw thread provided on the retention housing 450 of the assembly 100. Each cavity further has associated therewith an optical fiber 300, which, in combination with its associated end ferrule 305, is coupled via the retention housing 450 to a rear region of the assembly 100 to abut onto its fiber stub 220. The aforementioned compliant element 470 is operable to bias the fiber 300 within its ferrule 305 firmly onto the fiber stub 220 on ensure reliable optical radiation transmission thereat. In order to provide further mechanical protection, the body members 560a, 560b have attached thereto corresponding coupler shells 565a, 565b respectively; these coupler shells 565a, 565b can be fabricated from metal, plastics material, ceramic, glass for example. Optionally, the coupler shells 565a, 565b provide a hermetic seal to optical fibers 300 routed from the body members 560a, 560b respectively and also to the body members 560a, 560b respectively. More optionally, the retention housings 450 can also be arranged to provide a hermetic seal to their respective fibers 300 and also to their associated body members 560a, 560b. The body members 560a, 560b further include registration pins 570a, 570b at front regions thereof respectively as illustrated. These registrations pins 570a, 570b are operable to engage into corresponding holes 575a, 575b respectively in the body members 560b, 560a respectively for laterally registering the body members 560a, 560b when mutually coupled together. Axial registration is provided by the front regions of the body members 560a, 560b at least partially abutting together.

The multichannel coupler 550 provides several benefits in comparison to contemporary multichannel optical couplers. On account of collimated beams provided from the assemblies 100 of the multichannel coupler 550 being relative large in diameter, for example several millimeters in diameter, high precision for the registrations pins 570a, 570b is not required, nor for their corresponding holes 575a, 575b; for example, manufacturing dimensional errors in the order of 50 micrometers in the position of the registration pins 570a, 570b and their corresponding holes 575a, 575b can be tolerated provided that the dimensional errors do not prevent the coupler 550 being physically mated together. Moreover, accuracy of registration of the assemblies 100 in their respective cavities in the body members 560a, 560b is not especially critical to operation of the multichannel coupler 550. Furthermore, should it be required for maintenance or repair purposes, the fibers 300 and their associated ferrules 305 are susceptible to being uncoupled from or coupled to, albeit ideally in cleaner conditions than experienced in field use, their assemblies 100. Additionally, during initial assembly of the multichannel coupler 550, there is no requirement for performing precision alignment and adjustment because the assemblies 100 are provided automatically pre-aligned ready for use. Thus, the multichannel coupler 550 illustrated in FIG. 5b represents a considerable advance from contemporary approaches to manufacturing multichannel optical couplers; such contemporary approaches can involve many hours of adjustment whereas the multichannel coupler 550 is capable of being assembled within minutes at initial manufacture without a need to perform adjustments.

Figure 5C:
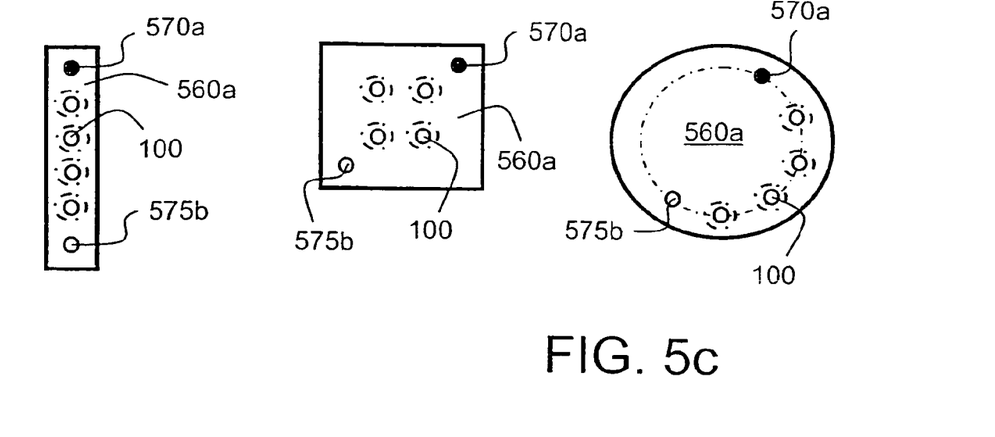

The assemblies 100 of the multichannel coupler 550 can be disposed in different formations as illustrated in FIG. 5c. In a first configuration illustrated, the assemblies 100 are disposed in a linear manner. Optionally, in a second configuration, the assemblies 100 are disposed as a two-dimensional matrix of assemblies 100. More optionally, in a third configuration, the assemblies 100 are disposed in an arcuate manner on a radius.

Figure 6:
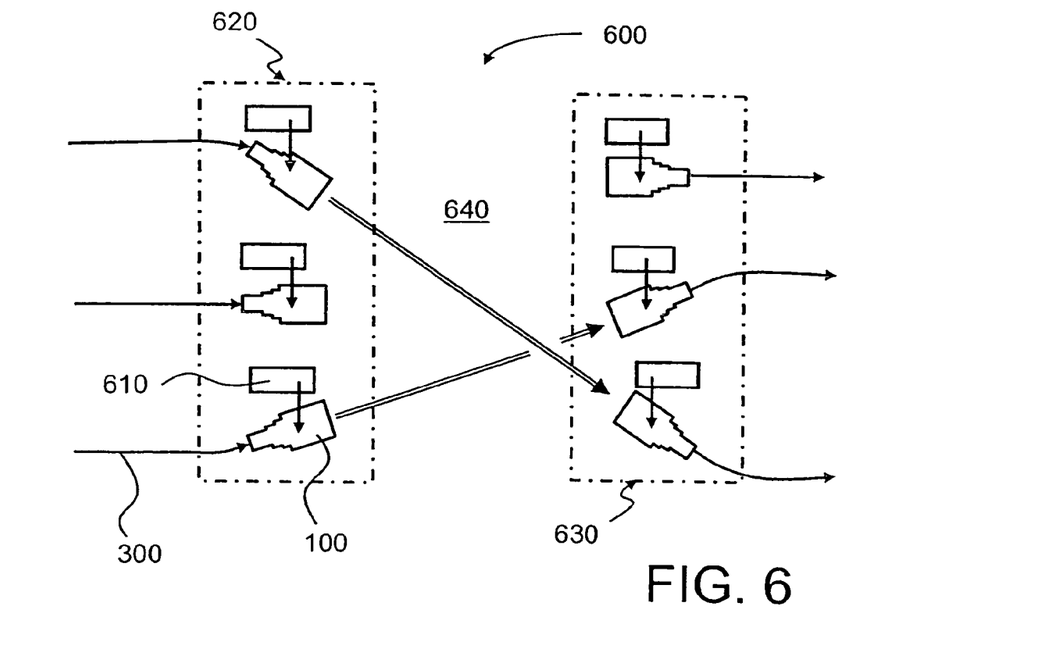
FIG. 6 is a schematic illustration of an optical switching network for selectively coupling optical radiation between optical fibers, the network including a plurality of optical assemblies of a type as illustrated in FIG. 2.

The assembly 100 is susceptible to being employed in diverse applications wherein relative insensitivity to alignment is required. For example, an optical switching network can be implemented by employing a plurality of the assemblies 100 wherein one or more of the assemblies 100 are coupled to associated actuators for spatially steering collimated beams provided from the assemblies 100. The assembly 100 is therefore capable of being employed in optical switching networks as developed, for example, by a company Polatis Ltd. in the United Kingdom and as described in their published patent application no. PCT/GB01/00062 (WO 01/50176). Such a switching network is illustrated schematically in FIG. 6 and indicated generally by 600 therein. The switching network 600 comprises several assemblies 100, each assembly 100 being provided with a corresponding actuator 610, for example an electromagnetic actuator or a piezo-electric actuator. The network 600 comprises two banks of actuated assemblies 100, namely a first bank 620 and a second bank 630. The banks 620, 630 can, for example, be implemented as two-dimensional arrays of the actuators 100. Moreover, the assemblies 100 of the banks 620, 630 face one another to define an intermediate free-space region 640 therebetween in which collimated radiation is capable of propagating in operation. Such a switching network 600 is of benefit in that optical switching losses for radiation coupled through the network 600 can be less than 1 dB which conforms with ETSI and Bellcore contemporary standards for communication equipment. Moreover, the network 600 is capable of selectively switching higher optical power levels than possible using contemporary MEMs-based optical beam switching networks. Thus, when used in telecommunications networks, the network 600 enables greater optical power levels to be employed, hence potentially avoiding a need for optical amplification, for example using erbium-doped fiber amplifiers (EDFA). Use of the assembly 100 for constructing the network 600 makes its manufacture more straightforward and reduces a need for adjustments and hence lower production cost and greater reliability to the network 600 when commissioned in use.

The assembly 100 is also capable of being used for constructing optical interconnects in communications apparatus. For example, in FIG. 7, there is shown a system indicated by 700. Such a system 700 is, for example, susceptible to being employed at nodal points in high-bandwidth wavelength division multiplexed (WDM) high-capacity optical communication systems. The system 700 includes a chassis disposed in a plurality of chassis elements 710, processing boards 720 including optical components as well as electrical components, and backplane boards 730. The chassis elements 710, the processing boards 720, and the backplane boards 730 include thereon one of more of the assemblies 100 as described earlier. For example, one of the processing boards 720 is illustrated including an electro-optical module 740 provided with a pig-tail optical fiber 300 terminated with a surrounding ferrule 305 as elucidated in the foregoing, the ferrule 305 being operable to enable mating to and unmating from a rear end of one of the assemblies 100 whereat access to its fiber stub 220 is provided. The electro-optical module 740 can be implemented as one of more of: a solid state laser, an optical transceiver, an optical receiver, a modulator.

Figure 7:
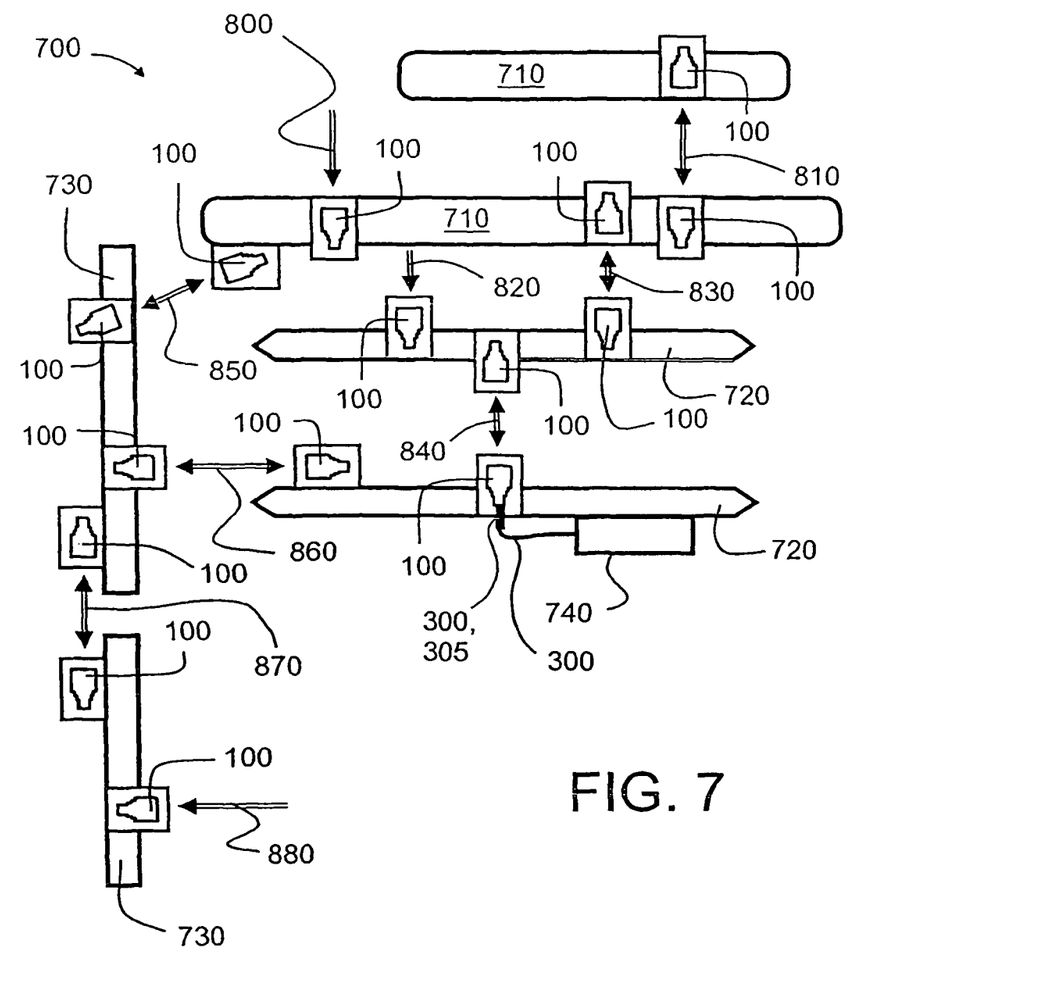
FIG. 7 is a schematic illustration of a system comprising a chassis and a plurality of processing boards and backplane boards, the optical system including optical assemblies of a type as illustrated in FIG. 2 for coupling optical radiation within the system, and externally thereto.

The system 700 is operable such that its assemblies 100 provide data communication therein. For example, an assembly 100 on one of the chassis elements 710 enables optical data communication by way of a collimated radiation beam 800 to an environment external to the chassis. Moreover, a pair of assemblies 100 included on the chassis elements 710 provides for optical communication therebetween by way of a collimated beam of optical radiation 810. Furthermore, a pair of assemblies 100 included on one of the chassis elements 710 and one of the processing boards 720 provides for optical communication therebetween by way of a collimated beam of optical radiation 830. An assembly 100 included on one of the processing boards 720 enables optical data communication by way of a collimated radiation beam 820 to an environment external to the system 700. A pair of assemblies 100 included on the processing boards 720 enables optical data communication therebetween by way of a collimated radiation beam 840; one of the assemblies 100 is coupled to the module 740 which is conveniently a standard proprietary sub-unit included within the system 700. A pair of assemblies 100 included on one of the chassis elements 710 and one of the backplane boards 730 provides for optical communication therebetween by way of a collimated beam of optical radiation 850. Additionally, a pair of assemblies 100 included on one of the backplane boards 730 and on one of the processing boards 720 provides for optical communication therebetween by way of a collimated beam of optical radiation 860. Moreover, a pair of assemblies 100 included on the backplane boards 730 provides for optical communication therebetween by way of a collimated beam of optical radiation 870. Finally, an assembly 100 included on one of the backplane boards 730 enables optical data communication by way of a collimated radiation beam 880 to an environment external to the system 700.

One or more of the chassis elements 710, the processing boards 720 and the backplane boards 730 include both optical and electrical connections, for example electrical power supply, electrical data busses, optical data busses, and optical control lines. Mechanical interfaces whereat the elements 710, the processing boards 720 and the backplane 730 couple spatially mutually reference so that the assemblies 100 are appropriately spatially mutually positioned in the system 700. The system 700 is of further benefit in that use of the optical radiation beams 800 to 880 potentially decreases signal cross-talk, provides for less impediment to air circulation within the system 700 for cooling purposes and can also potentially reduce weight of the system 700 by avoiding a need for cables for conveying data signals.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A communication optical assembly, comprising:
   an optical fiber arrangement operable to detachably receive an optical fiber terminated by a ferrule,
   a lens arrangement, said lens arrangement being spatially disposed relative to the optical fiber arrangement so as to provide an axial collimated and expanded beam of radiation in response to receiving radiation from the optical fiber arrangement and further to provide a focused beam of radiation to the optical fiber arrangement in response to receiving a collimated beam of radiation to the lens arrangement, and
   a plurality of elements for spatially disposing the optical fiber arrangement relative to the lens arrangement, the plurality of elements includes a lens holder, an alignment sleeve, and a fiber stub holder, the alignment sleeve and the stub holder are arranged in an overlapping configuration and provides for adjustment of the lateral position between the optical fiber arrangement and the lens arrangement, the lens holder and the alignment sleeve are arranged in an overlapping configuration and provides for adjustment of the axial position between the optical fiber arrangement and the lens arrangement without the use of screws.

2. The communication optical assembly as claimed in claim 1, wherein said plurality of elements provide positional adjustment during manufacture of the optical fiber arrangement relative to the lens arrangement.

3. The communication optical assembly as claimed in claim 1, wherein said adjustment of relative lateral position is provided by the plurality of elements with mutually abutting surfaces to accommodate lateral adjustment of the optical fiber arrangement relative to the lens arrangement.

4. The communication optical assembly as claimed in claim 3, wherein at least a portion of the mutually abutting surfaces are accessible at an exterior region of the communication optical assembly for enabling adjustment of the relative lateral position when the communication optical assembly is in an assembled state.

5. The communication optical assembly as claimed in claim 4, wherein the portion of the mutually abutting surfaces is disposed so as to allow for relative immobilization of the abutting surfaces for rendering permanent a given relative positioning of the lens arrangement relative to the optical fiber arrangement.

6. The communication optical assembly as claimed in claim 5, wherein the plurality of elements are fabricated from materials susceptible to being fused or bonded for achieving said relative immobilization.

7. The communication optical assembly as claimed in claim 5, wherein the plurality of elements are fabricated from one or more of: metal, plastics material, ceramic, sintered material, glass, silica, sapphire, and materials with optically refractive properties.

8. The communication optical assembly as claimed in claim 1, wherein said adjustment of relative axial position is provided by the plurality of elements with mutually abutting surfaces to accommodate axial adjustment of the optical fiber arrangement relative to the lens arrangement.

9. The communication optical assembly as claimed in claim 8, wherein at least a portion of the mutually abutting surfaces are accessible at an exterior region of the communication optical assembly for enabling adjustment of the relative axial position when the communication optical assembly is in an assembled state.

10. The communication optical assembly as claimed in claim 1, wherein the optical fiber arrangement comprises a fiber stub with an associated ferrule spatially disposed between the lens arrangement and the optical fiber for conveying radiation to and/or from the communication optical assembly.

11. The communication optical assembly as claimed in claim 10, wherein an end of the optical fiber arrangement facing towards said lens arrangement is spatially spaced apart therefrom to provide an increased diameter to the beam of radiation.

12. The communication optical assembly as claimed in claim 10, wherein an end of the optical fiber arrangement facing towards said lens arrangement is abutted to the lens arrangement.

13. The communication optical assembly as claimed in claim 10, wherein the plurality of elements are adapted to allow for repetitive cycles of mating/unmating of the optical fiber with its associated ferrule relative to the fiber stub whilst ensuring axial alignment thereof for enabling optical radiation to be substantially coupled therebetween.

14. The communication optical assembly as claimed in claim 10, wherein at least one of the lens arrangement and the fiber stub are provided with antireflection coatings for reducing optical reflection thereat.

15. The communication optical assembly as claimed in claim 10, wherein the fiber stub is provided with polished optical end faces whose planes are substantially perpendicular relative to a central optical axis of the fiber stub.

16. The communication optical assembly as claimed in claim 10, wherein the fiber stub is provided with one or more obliquely formed optical end faces whose planes are substantially non-perpendicular relative to a central optical axis of the fiber stub.

17. The communication optical assembly as claimed in claim 1, wherein the optical assembly further comprises an optical isolator in optical series with the optical fiber arrangement and the lens arrangement.

18. The communication optical assembly as claimed in claim 1, wherein the lens arrangement comprises at least one of: an aspherical lens, a spherical ball lens, a configuration having a plurality of lenses, and a graded-refractive index lens.

19. The communication optical assembly as claimed in claim 1, wherein:
    (a) the lens arrangement includes an aspherical or ball lens;
    (b) the optical fiber arrangement includes a fiber stub having an outer ferrule, said fiber stub and its ferrule being operable to mount within a split sleeve and to be attached to a first element of the plurality of elements;
    (c) the plurality of elements includes a second element thereof which is operable to support the aspherical or ball lens and function in cooperation with a third element to provide for axial adjustment of the communication optical assembly during manufacture; and
    (d) the plurality of elements are disposed so as to provide for lateral adjustment of the communication optical assembly during manufacture.

20. An optical coupler comprising a plurality of communication optical assemblies, each optical assembly being as claimed in claim 1, the optical coupler being provided with a plurality of optical fibers for conveying optical radiation thereto and/or therefrom via the plurality of communication optical assemblies.

21. An optical switching network comprising a plurality of communication optical assemblies, each communication optical assembly being as claimed in claim 1, said plurality of communication optical assemblies being provided with a beam steering arrangement for steering directions of collimated and expanded beams of radiation in operation via said plurality of communication optical assemblies, thereby selectively directing optical radiation via one or more of said communication optical assemblies and selectively through the optical switching network.

22. A system comprising one or more of chassis elements, processing boards and backplane boards, said system including one or more communication optical assemblies as claimed in claim 1 for coupling optical radiation between one or more of the chassis elements, the processing boards, the backplane boards, and to an environment external thereto.

23. A method of adjusting relative alignment of the lens arrangement to the optical fiber arrangement of the communication optical assembly as claimed in claim 1, said method comprising:
    (a) providing optical radiation to the optical fiber arrangement for propagating the lens arrangement for emission therefrom as a beam of radiation;
    (b) adjusting the plurality of elements of the communication optical assembly to ensure that the beam is laterally aligned relative to an optical axis of the lens arrangement; and
    (c) adjusting the plurality of elements of the communication optical assembly to ensure that the beam is substantially collimated.

24. A method of adjusting relative alignment of the lens arrangement to the optical fiber arrangement of the communication optical assembly as claimed in claim 1, said method comprising:
    (a) providing substantially axially to the lens arrangement a beam of substantially collimated optical radiation to the lens arrangement for propagation therethrough to the optical fiber arrangement;
    (b) adjusting plurality of elements of the communication optical assembly to adjust relative lateral positioning of the lens arrangement relative to the optical fiber arrangement so as to achieve a maximum coupling of radiation conveyed in the beam to the optical fiber arrangement; and
    (c) adjusting the plurality of elements of the communication optical assembly to adjust axial position of the lens arrangement relative to the optical fiber arrangement so as to achieve a maximum coupling of radiation conveyed in the beam to the optical fiber arrangement.

25. The method as claimed in claim 23, further comprising mutually immobilizing the adjusted plurality of elements to fixedly adjust the communication optical assembly.

26. The method as claimed in claim 25, wherein said mutual immobilization involves mutually fusing or binding the adjusted plurality of elements.

27. The method as claimed in claim 25, wherein the method is performed automatically.

28. The communication optical assembly as claimed in claim 1, wherein the plurality of elements allow for relative immobilization for rendering permanent a given relative positioning of the lens arrangement relative to the optical fiber arrangement.

29. The communication optical assembly as claimed in claim 3, wherein the plurality of elements provide for adjustment independently in lateral and axial directions.

30. The communication optical assembly as claimed in claim 1, wherein the plurality of elements are arranged in an overlapping sleeve configuration.

\* \* \* \* \*

UNITED STATES PATENT AND TRADEMARK OFFICE
CERTIFICATE OF CORRECTION

PATENT NO. : 9,791,632 B2  
APPLICATION NO. : 11/922912  
DATED : October 17, 2017  
INVENTOR(S) : Claes Jacobsson Page 1 of 1

It is certified that error appears in the above-identified patent and that said Letters Patent is hereby corrected as shown below:

In the Claims

Claim 29, Column 18, Line 51: "claim 3" should be "claim 1"

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*